United States Patent
Trutnovsky et al.

(10) Patent No.: US 9,908,386 B2
(45) Date of Patent: Mar. 6, 2018

(54) FRESH AIR CONTROL FOR A TRANSPORT REFRIGERATION UNIT

(71) Applicant: THERMO KING CORPORATION, Minneapolis, MN (US)

(72) Inventors: Petr Trutnovsky, Cervene Pecky (CZ); Luboš Forejt, Praha-zapad (CZ); Radim Čermák, Prague (CZ)

(73) Assignee: THERMO KING CORPORATION, Minneapolis, MN (US)

(*) Notice: Subject to any disclaimer, the term of this patent is extended or adjusted under 35 U.S.C. 154(b) by 0 days.

(21) Appl. No.: 15/039,212

(22) PCT Filed: Jun. 3, 2014

(86) PCT No.: PCT/US2014/040706
§ 371 (c)(1),
(2) Date: May 25, 2016

(87) PCT Pub. No.: WO2015/076872
PCT Pub. Date: May 28, 2015

(65) Prior Publication Data
US 2017/0136848 A1    May 18, 2017

Related U.S. Application Data

(60) Provisional application No. 61/908,463, filed on Nov. 25, 2013.

(51) Int. Cl.
*B60H 1/00* (2006.01)
*B60H 1/32* (2006.01)

(52) U.S. Cl.
CPC ........ *B60H 1/00849* (2013.01); *B60H 1/008* (2013.01); *B60H 1/00371* (2013.01);
(Continued)

(58) Field of Classification Search
CPC ............ B60H 1/00849; B60H 1/00864; B60H 1/3204; B60H 1/008; B60H 2001/3282
See application file for complete search history.

(56) References Cited

U.S. PATENT DOCUMENTS 3,733,849 A    5/1973    Cantagallo et al.
3,862,549 A *  1/1975    Fernandes .......... B60H 1/00371
                                                    165/42
(Continued)

FOREIGN PATENT DOCUMENTS

CN    100436177    11/2008
CN    101737910    6/2010
(Continued)

OTHER PUBLICATIONS

International Search Report for International Application No. PCT/US2014/040706 dated Sep. 25, 2014 (3 pages).
(Continued)

*Primary Examiner* — Kun Kai Ma
(74) *Attorney, Agent, or Firm* — Hamre, Schumann, Mueller & Larson, P.C.

(57) ABSTRACT

A system and method for controlling a transport heating, ventilation, and air conditioning (HVAC) system having a fresh air intake is disclosed. The fresh airflow intake system includes a fresh air damper configured to regulate a flow of fresh air into the transport HVAC system, an evaporator fan having at least a high-speed mode and a low speed mode, and a controller. The controller is configured to determine whether a fresh air condition is met and increase a fresh airflow in response to determining the fresh air condition is met. The controller is further configured to increase an evaporator fan speed when the fresh airflow is increased.

18 Claims, 4 Drawing Sheets

(52) U.S. Cl.
CPC ..... *B60H 1/00828* (2013.01); *B60H 1/00864* (2013.01); *B60H 1/3204* (2013.01); *B60H 2001/3282* (2013.01)

(56) References Cited

U.S. PATENT DOCUMENTS

| | | | |
|---|---|---|---|
| 3,896,634 A | 7/1975 | Nagele et al. | |
| 4,391,320 A | 7/1983 | Inoue et al. | |
| 4,646,964 A * | 3/1987 | Parker | F24F 11/0009 165/11.1 |
| 5,971,067 A * | 10/1999 | Rayburn | F24F 11/0017 165/217 |
| 5,976,010 A * | 11/1999 | Reese | F24F 11/0017 454/229 |
| 6,078,853 A * | 6/2000 | Ebner | B60H 3/0085 340/425.5 |
| 6,415,617 B1 * | 7/2002 | Seem | F24F 3/044 137/84 |
| 6,494,777 B1 | 12/2002 | Chiang | |
| 6,581,544 B1 | 6/2003 | Smith | |
| 6,679,075 B2 | 1/2004 | Kampf et al. | |
| 6,688,963 B2 | 2/2004 | Boiger | |
| 6,698,220 B2 * | 3/2004 | Yoneno | B60H 1/00371 62/184 |
| 6,708,513 B2 * | 3/2004 | Koehler | B60H 1/00371 62/244 |
| 6,718,784 B1 * | 4/2004 | Bushnell | B60H 1/00371 62/244 |
| 6,735,966 B2 | 5/2004 | Lissner et al. | |
| 6,758,739 B1 | 7/2004 | Sangwan et al. | |
| 6,763,669 B1 * | 7/2004 | Bushnell | B60H 1/00371 62/115 |
| 6,763,670 B1 * | 7/2004 | Bushnell | B60H 1/00371 62/200 |
| 6,923,111 B2 | 8/2005 | Kiefer et al. | |
| 6,925,827 B2 * | 8/2005 | Hille | B60H 1/00371 62/244 |
| 6,983,619 B2 * | 1/2006 | Hille | B60H 1/00371 62/244 |
| 7,051,544 B2 * | 5/2006 | Hille | B60H 1/00371 62/244 |
| 7,077,741 B2 | 7/2006 | Brenner et al. | |
| 7,472,554 B2 * | 1/2009 | Vosburgh | B60H 1/00742 236/94 |
| 7,758,407 B2 * | 7/2010 | Ahmed | F24F 11/0017 340/632 |
| 7,997,090 B2 | 8/2011 | Dai et al. | |
| 8,145,383 B2 | 3/2012 | Prokhorov | |
| 8,641,490 B2 | 2/2014 | Eisenhour | |
| 8,649,941 B1 | 2/2014 | Tsuda et al. | |
| 2004/0046038 A1 * | 3/2004 | Knowles | F24F 13/04 236/13 |
| 2005/0038582 A1 * | 2/2005 | Arndt | B60H 1/008 701/31.4 |
| 2006/0037339 A1 * | 2/2006 | Hassel | B60H 1/00371 62/244 |
| 2006/0150644 A1 * | 7/2006 | Wruck | F24F 11/0017 62/126 |
| 2007/0056299 A1 * | 3/2007 | Shankweiler | G05D 23/32 62/157 |
| 2008/0179408 A1 * | 7/2008 | Seem | F24F 11/0001 236/49.3 |
| 2008/0179409 A1 * | 7/2008 | Seem | F24F 11/0001 236/49.3 |
| 2009/0321039 A1 * | 12/2009 | Therrien | E04H 1/1238 165/11.1 |
| 2010/0120345 A1 * | 5/2010 | Ryan | B60H 1/00371 454/75 |
| 2011/0264273 A1 * | 10/2011 | Grabinger | F24F 11/0001 700/276 |
| 2012/0015594 A1 * | 1/2012 | Yenneti | B60H 1/00742 454/75 |
| 2013/0254989 A1 * | 10/2013 | Garcia | A47C 21/046 5/421 |
| 2014/0075977 A1 * | 3/2014 | Elliott | F24F 3/1405 62/176.1 |
| 2015/0032266 A1 * | 1/2015 | Weast | B60H 1/008 700/276 |
| 2015/0075373 A1 * | 3/2015 | Miller | F24F 3/1603 95/15 |

FOREIGN PATENT DOCUMENTS

| | | |
|---|---|---|
| CN | 102336129 | 2/2012 |
| DE | 10154387 | 5/2003 |
| EP | 2279885 | 5/2010 |
| JP | 04163269 | 6/1992 |
| JP | H04163269 | 6/1992 |
| JP | 2000219036 | 8/2000 |
| KR | 20090094978 | 9/2009 |
| WO | 9415805 | 7/1994 |

OTHER PUBLICATIONS

Written Opinion for International Application No. PCT/US2014/040706 dated Sep. 25, 2014 (9 pages).
Chinese Office Action issued in corresponding Chinese Application No. 201480072226.0 dated Jun. 30, 2017 (8 pages).
Supplementary European Search Report issued in corresponding European Application No. 14863536.0 dated Aug. 23, 2017 (9 pages).

* cited by examiner

FRESH AIR CONTROL FOR A TRANSPORT REFRIGERATION UNIT

FIELD

Embodiments of this disclosure relate generally to a heating, ventilation, and air conditioning (HVAC) system in a transport vehicle. More specifically, the embodiments relate to a system and method for controlling fresh air intake in an HVAC system of a transport vehicle.

BACKGROUND

An HVAC system, such as an air conditioning system for a transport vehicle (e.g., a passenger bus, passenger railcar, etc.), may be included on a transport vehicle to condition air of an interior space (e.g., passenger compartment) of the transport vehicle. In some transport vehicles, the transport HVAC system can be installed externally (e.g., on a rooftop of the transport vehicle). The transport HVAC system can include a fresh air intake to input fresh air into the interior space of the transport vehicle. The transport HVAC system can also be configured to return air that is not fresh to the environment.

SUMMARY

Embodiments of this disclosure relate generally to an HVAC system in a transport vehicle. More specifically, the embodiments relate to a system and method for controlling fresh air intake in an HVAC system of a transport vehicle.

In some embodiments, a transport vehicle includes a passenger bus. In some embodiments, a transport vehicle includes a passenger railcar. In some embodiments, a transport vehicle includes other types of passenger vehicles, such as ships, airplanes, etc.

Operating an evaporator fan in a high speed mode when a fresh air damper is in an open position, even when a passenger compartment of a transport vehicle is near a set point temperature, can increase the efficiency of a transport HVAC system. In some embodiments, opening the fresh air damper and operating the evaporator fan in the high speed mode even when an air quality measurement is within an optimal range can increase the efficiency of the transport HVAC system. In some embodiments, increasing the efficiency of the transport HVAC system can reduce fuel consumption and emissions of a transport vehicle.

In some embodiments, a controller of a transport HVAC system can monitor one or more indicators of air quality. Indicators of air quality can, for example, include a carbon dioxide level, a volatile organic compound (VOC) level, a relative humidity level, a dust level, or other similar indication of air quality that can be sensed from a passenger compartment (conditioned space) of a transport vehicle.

A method to control a transport HVAC system having a fresh air intake is disclosed. The method includes monitoring one or more of an air quality, a set point temperature, and an ambient temperature. The method includes determining whether a fresh air condition is met based on the monitoring and opening a fresh air damper when the fresh air condition is met. Further, the method includes increasing an evaporator fan speed in response to opening the fresh air damper.

A fresh airflow intake system for a transport HVAC system is disclosed. The fresh airflow intake system includes a fresh air damper configured to regulate a flow of fresh air into the transport HVAC system, an evaporator fan having at least a high-speed mode and a low speed mode, and a controller. The controller is configured to determine whether a fresh air condition is met and increase a fresh airflow in response to determining the fresh air condition is met. The controller is further configured to increase an evaporator fan speed when the fresh airflow is increased.

A method to control a transport HVAC system having a fresh air intake is disclosed. The method includes determining a passenger compartment temperature from a temperature sensor and comparing, by a controller, the passenger compartment temperature with a set point temperature. The method also includes determining an air quality measurement from an air quality sensor. A fresh air damper is opened when the passenger compartment temperature and the set point temperature are within a threshold range and the air quality measurement is below a minimum air quality threshold. A speed of an evaporator fan is increased in response to opening the fresh air damper.

BRIEF DESCRIPTION OF THE DRAWINGS

References are made to the accompanying drawings that form a part of this disclosure, and which illustrate the embodiments in which the systems and methods described in this Specification can be practiced.

Like reference numbers represent like parts throughout.

DETAILED DESCRIPTION

Embodiments of this disclosure relate generally to a heating, ventilation, and air conditioning (HVAC) system in a transport vehicle. More specifically, the embodiments relate to a system and method for controlling fresh air intake in an HVAC system of a transport vehicle.

A transport HVAC system, such as a transport air conditioning system, may be generally configured to control one or more environmental conditions (e.g., temperature, humidity, air quality, etc.) in an interior space (e.g., passenger compartment) of a transport vehicle (e.g., a passenger bus, a passenger railcar, etc.). Generally, the passenger compartment of a transport vehicle can be supplied with fresh air (e.g., outside air) by the transport HVAC system. In most transport vehicles, the transport HVAC system is designed to supply a quantity of fresh air that satisfies a maximum occupancy of the transport vehicle.

In some instances, a transport HVAC system can be configured for demand controlled ventilation. Demand controlled ventilation is a method to control the amount of fresh air input into the transport vehicle based on the occupancy of the transport vehicle. For example, when the occupancy is below the maximum occupancy, the amount of fresh air supplied to the passenger compartment is reduced.

Embodiments of this disclosure generally control a speed of an evaporator fan and a position of a fresh air damper in a transport HVAC system. In some embodiments, running the evaporator fan in a high speed mode and opening the fresh air damper can increase the fuel efficiency and reduce the emissions from a transport vehicle having a transport HVAC system. Further, running the evaporator fan in the high speed mode and opening the fresh air damper can create a surplus of fresh air in the passenger compartment, which can increase the amount of time before fresh air needs to again be added to the passenger compartment (e.g., increased amount of time where fresh air damper is closed). In some embodiments, increasing the amount of time where the fresh air damper is closed can reduce the refrigeration demand, save fuel, and/or increase a life of an air filter.

A transport HVAC system may be most efficient (e.g., ratio of cooling output to power required) when the evaporator fan is in a high speed mode. Accordingly, embodiments of this disclosure take advantage of this efficiency and run the evaporator fan in the high speed mode when a fresh air damper is opened.

A "transport vehicle" includes, for example, a vehicle having a passenger compartment. The passenger compartment in a transport vehicle can include a transport heating, ventilation, and air conditioning (HVAC) system. In some embodiments, the transport vehicle can include a bus, a passenger railcar, etc.

A "transport HVAC system" includes, for example, an air conditioning system configured to control an environment variable (e.g., temperature, humidity, air quality, etc.) in a conditioned space of a transport vehicle.

A "conditioned space" includes, for example, any space which is to have a controlled environment variable (e.g., temperature, humidity, air quality, etc.). The conditioned space can be a passenger compartment in a transport vehicle. The temperature, humidity, air quality, etc. of the conditioned space can be controlled, for example, for the comfort of occupants.

A "fresh air damper" includes, for example, a valve or plate that can be configured to control the input of fresh air into a transport HVAC system. For example, closing the fresh air damper can prevent fresh air from flowing into the transport HVAC system and opening the fresh air damper can allow the fresh airflow.

Figure 1:
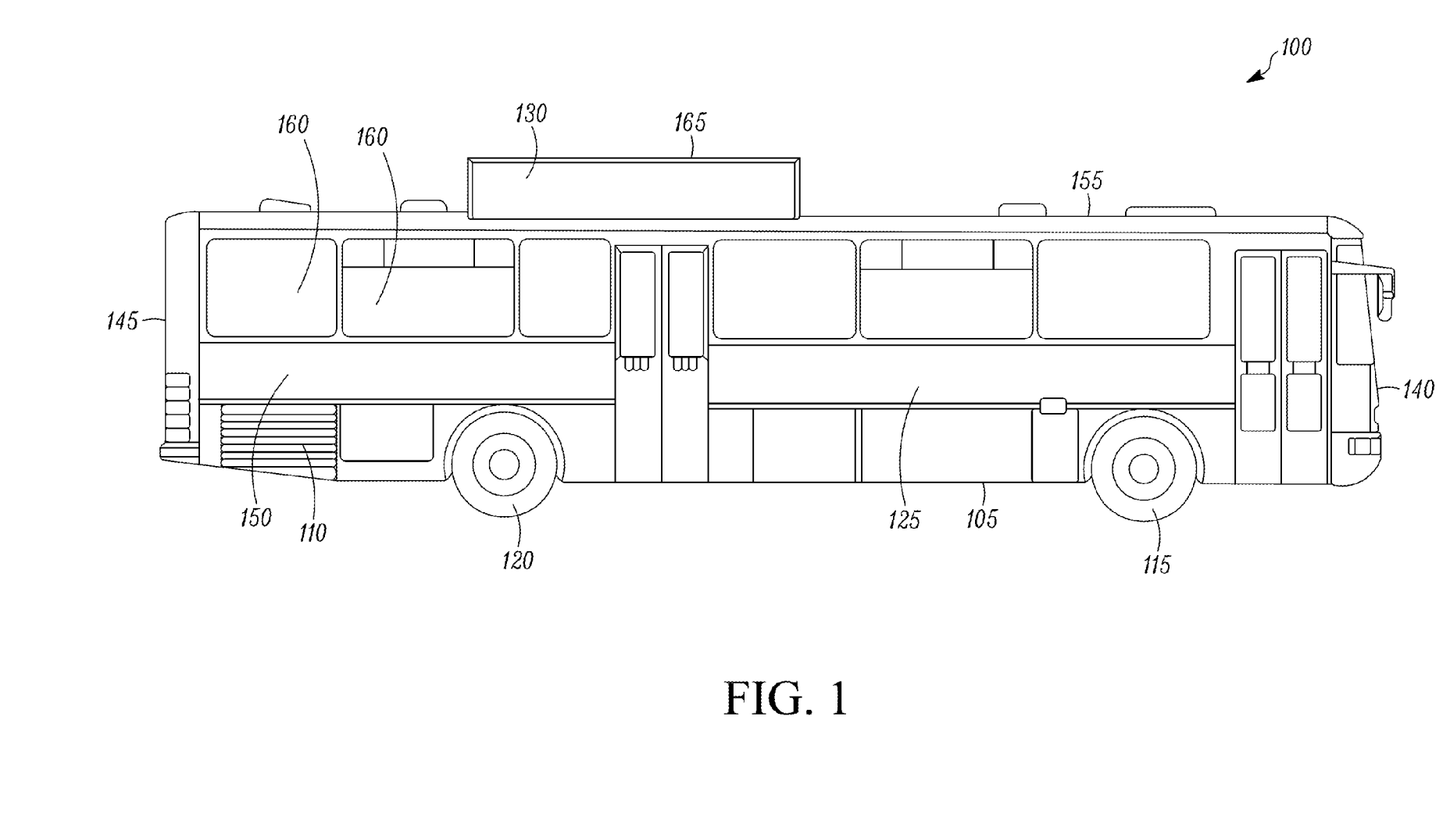
FIG. 1 illustrates a side view of a transport vehicle including a transport HVAC system, according to some embodiments.

FIG. 1 illustrates a side view of a transport vehicle 100 including a transport HVAC system 130, according to some embodiments. The illustrated transport vehicle 100 is a passenger bus. In some embodiments, the transport vehicle 100 can be another type of passenger vehicle (e.g., a passenger railcar, etc.).

The transport vehicle 100 includes a frame 105, an engine (not shown) (e.g., an internal combustion engine, etc.) disposed within an engine compartment 110, front wheels 115, and rear wheels 120. A passenger compartment 125 represents a conditioned space of the transport vehicle 100. In some embodiments, the passenger compartment 125 can also be referred to as the cabin 125. The passenger compartment 125 can also be referred to as the conditioned space of the transport vehicle 100 and can be heated or cooled with the transport HVAC system 130. In some embodiments, the passenger compartment 125 can be heated or cooled by opening one or more windows 160. The transport vehicle 100 can also include an optional air cleaning unit (not shown in FIG. 1).

The passenger compartment 125 includes a front 140, a back 145, a right side 150, a left side (not shown in FIG. 1), and a roof 155. As illustrated, the right side 150 includes windows 160. The left side can be the same as or similar to the right side 150. In some embodiments, the left side can be different than the right side 150. For example, the left side may not include windows.

Figure 2:
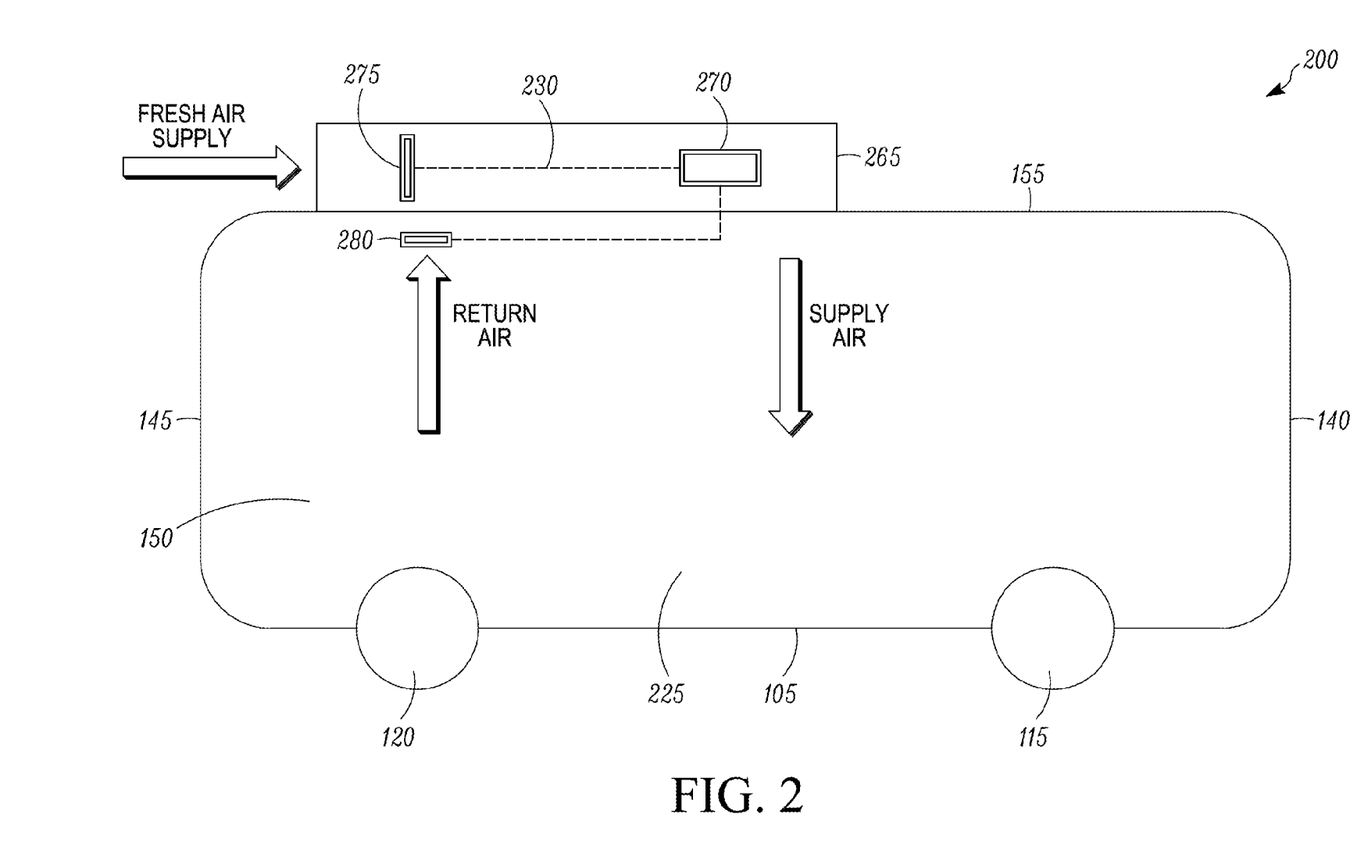
FIG. 2 illustrates a block diagram of a side view of a transport vehicle including a transport HVAC system with a fresh air control system, according to some embodiments.

The transport HVAC system 130 can include a fresh air intake (not shown in FIG. 1), a compressor (not shown in FIG. 1), a condenser (not shown in FIG. 1), an expansion valve (not shown in FIG. 1), an evaporator (not shown in FIG. 1), and a conditioned air discharge (not shown in FIG. 1). The components of the transport HVAC system 130 can be housed within a housing 165. The housing 165 can protect the components of the transport HVAC system 130 from environmental conditions (e.g., rain, snow, ultraviolet rays, etc.). The housing 165 can also function as an aesthetic feature that prevents people from seeing the individual components of the transport HVAC system 130. The transport HVAC system 130 can include additional components in some embodiments. For example, the transport HVAC system 130 can include a dryer (not shown in FIG. 1), an economizer (not shown in FIG. 1), a prime mover (not shown in FIG. 1), and other components (e.g., a controller and a fresh air damper as shown in FIG. 2). The housing 165 can include additional components in some embodiments. For example, the housing 165 can include a controller (not shown in FIG. 1), a power source (e.g., a battery, etc.) (not shown in FIG. 1), and other similar components.

The optional air cleaning unit can include a filter media (not shown) for filtering contaminants (e.g., dust particles, etc.) out of the conditioned air being provided to the passenger compartment 125. Similar to the transport HVAC system 130, the optional air cleaning unit can include an air cleaner housing (not shown in FIG. 1). The air cleaner housing can function similar to the housing 165 of the transport HVAC system 130 and can, for example, be included for aesthetics or to protect the air cleaning unit from environmental conditions.

FIG. 2 illustrates a block diagram of a side view of a transport vehicle 200 including a transport HVAC system 230 with a fresh air control system, according to some embodiments. The illustrated transport vehicle 200 is a passenger bus. In some embodiments, the transport vehicle 200 can be another type of passenger vehicle (e.g., a passenger railcar, etc.). Aspects of FIG. 2 can be the same as or similar to aspects of FIG. 1.

The transport vehicle 200 includes a passenger compartment 225 that represents a conditioned space of the transport vehicle 200. In some embodiments, the passenger compartment 225 can also be referred to as the cabin 225. The passenger compartment 225 can also be referred to as the conditioned space 225 of the transport vehicle 200. The passenger compartment 225 can be heated or cooled with a transport HVAC system 230. In some embodiments, the transport vehicle 200 can also include an air cleaning unit (not shown in FIG. 2). The optional air cleaning unit can be incorporated into the transport HVAC system 230.

The passenger compartment 225 includes a sensor 280. In some embodiments, there is a plurality of sensors 280. The sensor 280 can be configured to provide feedback to an HVAC controller 270 regarding one or more environmental conditions. The HVAC controller 270 and the sensor 280 are described in further detail below.

The transport HVAC system 230 can include a fresh air intake (not shown in FIG. 2), a compressor (not shown in FIG. 2), a condenser (not shown in FIG. 2), an expansion valve (not shown in FIG. 2), an evaporator (not shown in FIG. 2), and a supply air outlet (not shown in FIG. 2). The components of the transport HVAC system 230 can be housed within the housing 265. The transport HVAC system 230 can include additional components in some embodiments. For example, the transport HVAC system 230 can include a dryer (not shown in FIG. 2), an economizer (not shown in FIG. 2), a prime mover (not shown in FIG. 2), and other components (e.g., a fresh air damper 275, etc.).

The evaporator (not shown in FIG. 2) can include an evaporator fan (not shown in FIG. 2). The evaporator fan can operate in a high speed mode or a low speed mode. In some embodiments, the evaporator fan can operate in a low speed mode, a high speed mode, and at least one intermediate mode (e.g., a medium speed mode that is between high speed mode and low speed mode, etc.). In some embodiments, the evaporator fan can be a variable speed evaporator fan that can operate at variable speeds between a high speed mode and a low speed mode. In some embodiments, the transport HVAC system 230 can include variable speed evaporator fans without a fresh air damper. In such a system, an evaporator fan at high speed may operate similarly to an evaporator fan with a constant speed and an open fresh air damper. An evaporator fan at low speed may operate similarly to an evaporator fan with a constant speed and a closed fresh air damper.

The transport HVAC system 230 includes the HVAC controller 270 and a fresh air damper 275. The HVAC controller 270 and the fresh air damper 275 are in communication.

The HVAC controller 270 can be configured to manage, command, direct, and regulate the behavior of one or more components of the transport HVAC system 230 (e.g., the fresh air damper 275, etc.). The HVAC controller 270 can control the transport HVAC system 230 to obtain various operating conditions (e.g., temperature, humidity, air quality, etc.) of the passenger compartment 225. The HVAC controller 270 can be powered by a primary mover (not shown) and/or another power source electrically connected to the HVAC controller 270 (e.g., a battery).

The HVAC controller 270 can include a processor (not shown in FIG. 2), a memory (not shown in FIG. 2), a clock (not shown in FIG. 2), and an input/output (I/O) interface (not shown in FIG. 2), etc. In some embodiments, the HVAC controller 270 can include fewer or additional components. The HVAC controller 270 can be configured to modify a position of the fresh air damper 275 to control an amount of fresh air input into the passenger compartment 225. Modifying the position of the fresh air damper 275 is described in additional detail in accordance with FIGS. 3A and 3B below.

The fresh air damper 275 can be configured to control an amount of fresh air input into the passenger compartment 225 of the transport vehicle 200. The fresh air damper 275 can have two positions (e.g., open or closed), according to some embodiments. In a closed position, the fresh air damper 275 can prevent fresh air from entering the transport vehicle 200. In an open position, the fresh air damper 275 can input fresh air into the transport vehicle 200. One or more operating conditions (e.g., evaporator fan speed, etc.) of the transport HVAC system 230 can be modified by the controller 270 in conjunction with opening or closing the fresh air damper 275.

In some embodiments, the fresh air damper 275 can have more than two positions. For example, the fresh air damper 275 can have at least one intermediate position in which fresh air is input into the transport vehicle 200 in some amount that is less than the air input when the fresh air damper 275 is in the fully opened position.

The sensor 280 is located within the passenger compartment 225 and is configured to provide feedback on one or more environmental conditions of the passenger compartment 225 to the HVAC controller 270. In some embodiments, the sensor 280 can be located within a duct (not shown) of the transport HVAC system 230. In some embodiments, the sensor 280 can be located in a return air duct (not shown) in the transport HVAC system 230. The sensor 280 can include a variety of sensors configured to detect air quality. For example, the sensor 280 can be a carbon dioxide sensor, a relative humidity sensor, a dust sensor, a volatile organic compound sensor (VOC), or other suitable air quality sensor. In some embodiments, the sensor 280 can be a combination of two or more types of air quality sensors. The sensor 280 can include a temperature sensor in some embodiments.

The optional air cleaning unit (not shown in FIG. 2) can include a filter media for filtering contaminants (e.g., dust particles, etc.) out of the conditioned air being provided to the passenger compartment 225 (e.g., the supply air). Similar to the transport HVAC system 230, the air cleaning unit can include an air cleaner housing (not shown in FIG. 2) that is separate from the transport HVAC system 230. The air cleaner housing may function similar to the housing 265 and can, for example, be included for aesthetics or to protect the air cleaning unit. In some embodiments, the optional air cleaning unit can be contained within the housing 265 of the transport HVAC system 230.

Figure 3A:
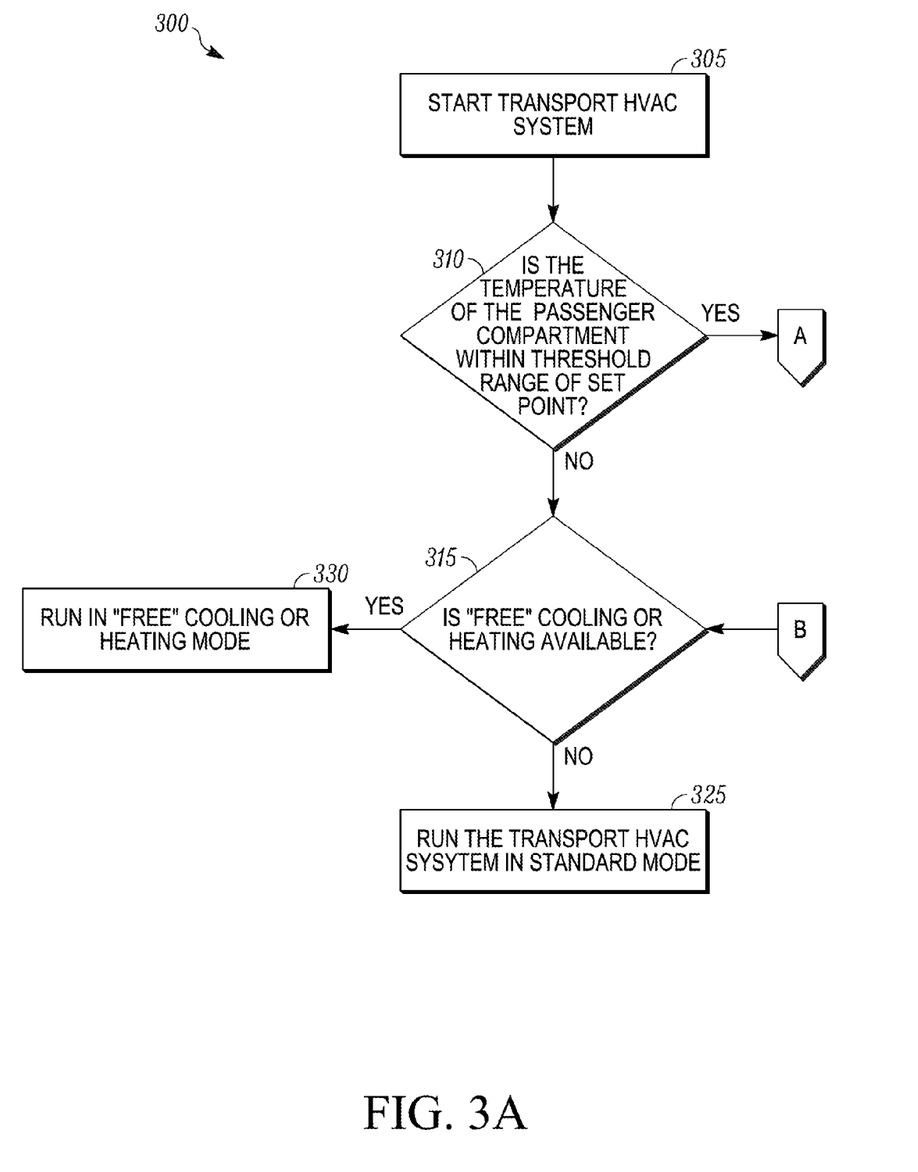
FIG. 3A illustrates a flowchart of a method to control a fresh air intake system of a transport HVAC system, according to some embodiments.
Figure 3B:
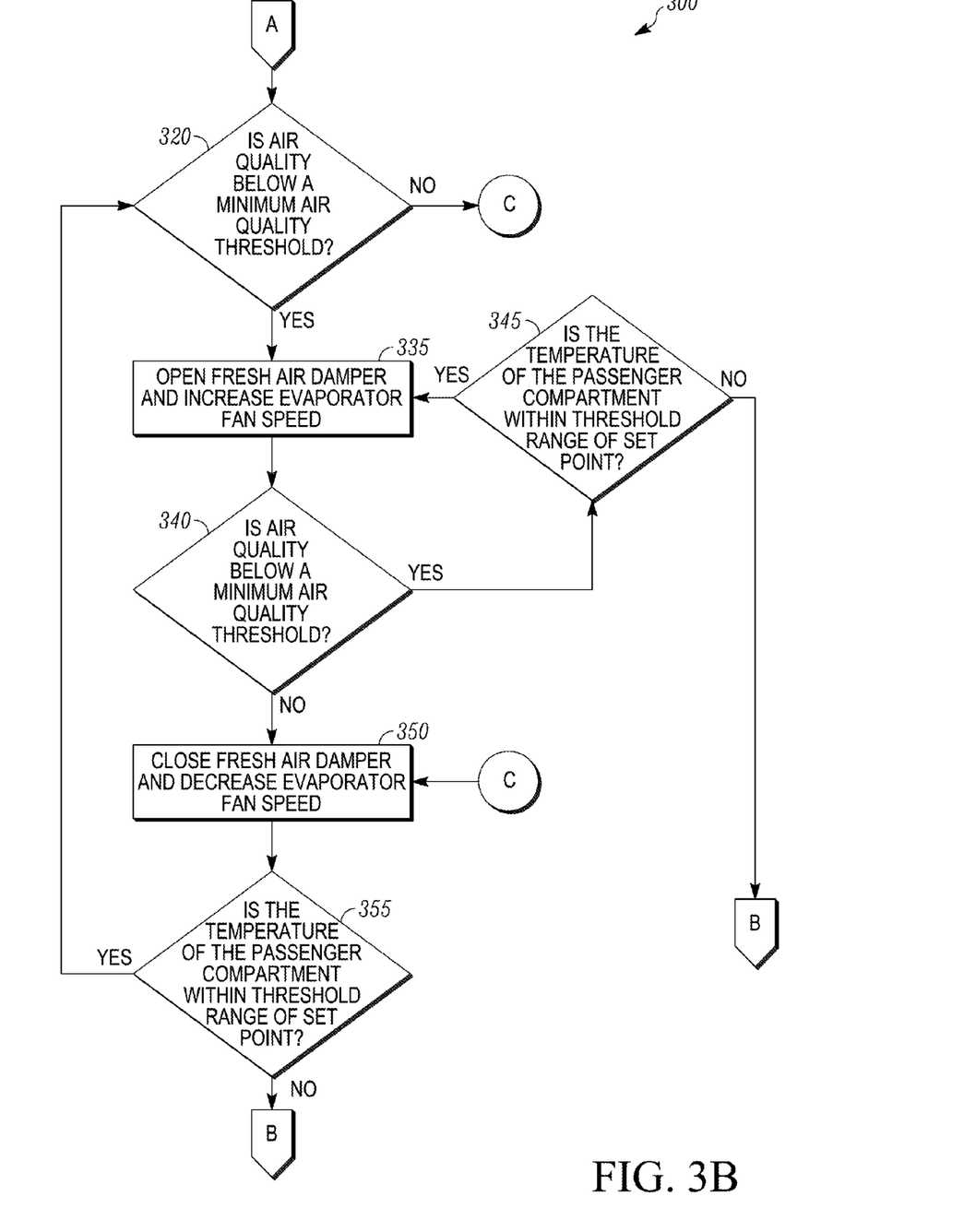
FIG. 3B illustrates a continuation of the flowchart of FIG. 3A of the method to control the fresh air intake system of the transport HVAC system, according to some embodiments.

FIGS. 3A and 3B illustrate a flowchart of a method 300 to control a transport HVAC system (e.g., the transport HVAC system 230 shown in FIG. 2), according to some embodiments. The method 300 generally controls a supply of fresh air into a passenger compartment (e.g., the passenger compartment 225 shown in FIG. 2) of a transport vehicle (e.g., a passenger bus such as in FIG. 1 or 2, a passenger railcar, etc.). By controlling the supply of fresh air, the method 300 can maintain air quality within the passenger compartment.

The method 300 begins at 305 when the transport HVAC system is started (e.g., powered on). In some embodiments, the method 300 repeats while the transport HVAC system is powered on.

At 310, the controller determines whether a temperature of the passenger compartment is within a threshold range of a set point temperature of the passenger compartment. The threshold range can, for example, be based on a thermostat of the transport HVAC system. In some embodiments, the range, for example, can be plus or minus about two degrees from the set point temperature. However, it will be appreciated that the range may be modified based on a particular application or user preference. If the temperature of the passenger compartment is not within the threshold range, then the method 300 continues to 315. If the temperature is within the threshold range, then the method 300 continues to 320.

At 315, the controller determines whether free heating or cooling is available. Free cooling is considered available when the ambient temperature is lower than the set point temperature. For example, in some embodiments, free cooling is available when the ambient temperature is within the range from about the set point temperature to about two degrees less than the set point temperature. Free heating is available when the ambient temperature is greater than the set point temperature. For example, in some embodiments, free heating is available when the ambient temperature is within the range from about the set point temperature to about two degrees greater than the set point temperature. The range above or below the set point temperature in which free heating or free cooling (respectively) is available can be a range other than about two degrees. The range can vary and be modified based on a particular application or user preference.

When free heating or cooling is available, the HVAC system can open the fresh air damper and disable either heating or cooling, providing air at the ambient temperature. In some embodiments, when the ambient temperature is within the threshold range of the temperature of the passenger compartment, the windows or doors may be opened to provide free heating or cooling. When the ambient temperature is within the threshold range of the temperature of the passenger compartment, less energy (e.g., fuel, etc.) is consumed by the transport HVAC system to heat or cool the air being provided to the passenger compartment.

When free heating or cooling is available, the method 300 continues to 330 and is run in free heating/cooling mode. In some embodiments, free heating/cooling mode includes opening a fresh air damper (e.g., the fresh air damper 275 shown in FIG. 2) and turning the evaporator fan to a high speed mode regardless of whether an air quality measurement is below a minimum air quality limit. Further, the fresh air damper can be opened and the evaporator fan can be operated in a high speed mode without having to consider the vehicle occupancy. Accordingly, a surplus of fresh air can be added to the passenger compartment.

In some embodiments, opening the fresh air damper includes fully opening the fresh air damper. In some embodiments, opening the fresh air damper includes opening the fresh air damper to an intermediate position. When the fresh air damper is open and the evaporator fan is in the high speed mode, fresh air is introduced into the passenger compartment of the transport vehicle.

In some embodiments, the free heating or cooling mode can continue until the set point temperature is reached. In other embodiments, free heating can continue until the set point temperature is reached or until the ambient temperature is lower than the temperature of the passenger compartment and free cooling can continue until the set point temperature is reached or until the ambient temperature is greater than the temperature of the passenger compartment.

When free heating or cooling is not available or the set point temperature is reached, then the method 300 continues to 325 and operates in standard mode. In some embodiments, the standard mode can also be referred to as temperature control mode. In the standard mode, the transport HVAC system runs the evaporator fan in the high-speed mode when the temperature of the passenger compartment is outside the threshold range of the set point temperature and in the low speed mode when the temperature of the passenger compartment is within the threshold range of the set point temperature. That is, in the standard mode, temperature control takes precedence over demand controlled ventilation. For example, in the standard mode, when the evaporator fan is in the high-speed mode, the fresh air damper may be closed to prevent introduction of ambient air at an undesired temperature (e.g., warmer ambient air if cooling or cooler ambient air if heating).

If the temperature of the passenger compartment is within the threshold range of the set point temperature as determined in 310, the method 300 continues to 320.

At 320, the controller determines whether an air quality measurement in the passenger compartment is below a minimum air quality threshold. In some embodiments, the air quality measurement can be a reading from a sensor (e.g., the sensor 280 shown in FIG. 2). The sensor can be a carbon dioxide sensor, a volatile organic compound sensor (VOC), or other similar type of sensor. If the air quality measurement is below a minimum air quality threshold, even though the temperature of the passenger compartment is within the threshold range of the set point temperature, the controller will open the damper and increase the evaporator fan speed at 335 so that the transport HVAC system is operating at an increased efficiency.

If the air quality measurement at 320 is above the minimum air quality threshold (e.g., the air quality is within an acceptable range), the method 300 continues to 350, which will be discussed in additional detail below. The value of the minimum air quality threshold may depend on the type of sensor and therefore, the parameter of the air being measured. For example, a minimum air quality threshold for carbon dioxide may be different than a minimum air quality threshold for a VOC. The minimum air quality threshold can be set based on air quality standards or simulation testing to identify a comfortable air quality operating region.

Following 335, the method 300 continues to 340. At 340, the controller again takes an air quality measurement from the passenger compartment of the transport vehicle. If the air quality measurement is below the air quality threshold, the controller will determine whether the temperature of the passenger compartment is within the threshold range of the set point temperature at 345. If the air quality measurement is not below the air quality threshold, the method 300 continues to 350.

At 345, if the temperature of the passenger compartment is within the threshold range of the set point temperature, the method 300 continues to 335. If, however, the temperature of the passenger compartment is not within the threshold range of the set point temperature, the method 300 continues to 315.

At 350, the controller closes the fresh air damper and decreases the evaporator fan speed. Following 350, the method 300 continues to 355 and determines whether the temperature of the passenger compartment is within the threshold range of the set point temperature. If the temperature is within the threshold range, then the method 300 continues to 320. If, however, the temperature is not within the threshold range, then the method continues to 315.

ASPECTS

It is noted that any of aspects 1-9 below can be combined with any of aspects 10-13, 14-19, or 20-21. Any of aspects 10-13 can be combined with any of aspects 1-9, 14-19, or 20-21. Any of aspects 14-19 can be combined with any of aspects 1-9, 10-13, or 20-21. Further, any of aspects 20-21 can be combined with any of aspects 1-9, 10-13, or 14-19.

Aspect 1. A method to control a transport heating, ventilation, and air conditioning (HVAC) system having a fresh air intake, comprising:
  monitoring one or more of an air quality, a set point temperature, and an ambient temperature;
  determining whether a fresh air condition is met based on the monitoring;
  opening a fresh air damper when the fresh air condition is met; and
  increasing an evaporator fan speed in response to opening the fresh air damper.

Aspect 2. The method according to aspect 1, wherein opening the fresh air damper includes opening the fresh air damper to an intermediate position, the intermediate position being between an opened position and a closed position.

Aspect 3. The method according to any of aspects 1-2, wherein increasing the evaporator fan speed includes increasing the evaporator fan speed to an intermediate evaporator fan speed that is below a maximum evaporator fan speed.

Aspect 4. The method according to any of aspects 1-3, further comprising:
closing the fresh air damper when the fresh air condition is no longer met; and
decreasing the evaporator fan speed in response to closing the fresh air damper.

Aspect 5. The method according to aspect 4, wherein closing the fresh air damper includes closing the fresh air damper to an intermediate position, the intermediate position being between a closed and an opened position.

Aspect 6. The method according to any of aspects 4-5, wherein decreasing the evaporator fan speed includes decreasing the evaporator fan speed to an intermediate evaporator fan speed that is above a minimum evaporator fan speed.

Aspect 7. The method according to any of aspects 1-6, wherein the fresh air condition includes:
a minimum air quality threshold, the fresh air condition being met when the monitoring identifies an air quality that is below the minimum air quality threshold.

Aspect 8. The method according to any of aspects 1-7, wherein the fresh air condition includes:
a temperature threshold range, the fresh air condition being met when the set point temperature and the ambient temperature are within the threshold range of each other.

Aspect 9. A fresh airflow intake system for a transport heating, ventilation, and air conditioning (HVAC) system, comprising:
a fresh air damper configured to regulate a flow of fresh air into the transport HVAC system;
an evaporator fan having at least a high speed mode and a low speed mode; and
a controller, the controller configured to:
determine whether a fresh air condition is met,
increase a fresh airflow in response to determining the fresh air condition is met, and
increase an evaporator fan speed when the fresh airflow is increased.

Aspect 10. The fresh airflow intake system according to aspect 9, further comprising one or more air quality sensors, and wherein the fresh air condition is met when the air quality determined from the one or more air quality sensors is below a minimum air quality threshold.

Aspect 11. The fresh airflow intake system according to aspect 10, wherein the one or more quality sensors includes a carbon dioxide sensor configured to detect an amount of carbon dioxide in a passenger compartment of a transport vehicle.

Aspect 12. The fresh airflow intake system according to any of aspects 9-11, wherein the controller is further configured to:
determine a set point temperature and an ambient temperature, and wherein the fresh air condition is met when the set point temperature is within a threshold range of the ambient temperature.

Aspect 13. The fresh airflow intake system according to any of aspects 9-12, the controller further configured to:
decrease the fresh airflow in response to determining the fresh air condition is no longer met; and
decrease the evaporator fan speed when the fresh airflow is decreased.

Aspect 14. A method to control a transport heating, ventilation, and air conditioning (HVAC) system having a fresh air intake, comprising:
determining a passenger compartment temperature from a temperature sensor;
comparing, by a controller, the passenger compartment temperature with a set point temperature;
determining an air quality measurement from an air quality sensor;
opening a fresh air damper when the passenger compartment temperature and the set point temperature are within a threshold range and the air quality measurement is below a minimum air quality threshold; and
increasing an evaporator fan speed in response to opening the fresh air damper.

Aspect 15. The method according to aspect 14, wherein opening the fresh air damper includes opening the fresh air damper to an intermediate position, the intermediate position being between an opened position and a closed position.

Aspect 16. The method according to any of aspects 14-15, wherein increasing the evaporator fan speed includes increasing the evaporator fan speed to an intermediate evaporator fan speed that is below a maximum evaporator fan speed.

Aspect 17. The method according to any of aspects 14-16, further comprising:
closing the fresh air damper when the air quality measurement is above the minimum air quality threshold; and
decreasing the evaporator fan speed in response to closing the fresh air damper.

Aspect 18. The method according to aspect 17, wherein closing the fresh air damper includes closing the fresh air damper to an intermediate position, the intermediate position being between a closed and an opened position.

Aspect 19. The method according to any of aspects 17-18, wherein decreasing the evaporator fan speed includes decreasing the evaporator fan speed to an intermediate evaporator fan speed that is above a minimum evaporator fan speed.

Aspect 20. A method to control a transport heating, ventilation, and air conditioning (HVAC) system having a fresh air intake, comprising:
determining a set point temperature;
determining an ambient air temperature;
opening a fresh air damper when the ambient air temperature is within a threshold range of the set point temperature; and
increasing an evaporator fan speed in response to opening the fresh air damper.

Aspect 21. The method according to aspect 20, further comprising:
closing the fresh air damper when the ambient air temperature is outside a threshold range of the set point temperature; and
decreasing the evaporator fan speed in response to closing the fresh air damper.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

The flowcharts described in this Specification set forth the operations in an order which is indicative of some embodiments of the present disclosure. It is noted that in some embodiments, the order of the operations can vary. Further, one or more of the operations can be combined, or alternatively, separated into multiple operations. Other similar operations and the order of the operations may be equivalent in function, logic, or effect, without departing from the basic scope of the operations described.

With regard to the preceding description, it is to be understood that changes may be made in detail, especially in matters of the construction materials employed and the shape, size, and arrangement of parts without departing from the scope of the present disclosure. The word "embodiment" as used within this Specification may, but does not necessarily, refer to the same embodiment. This Specification and the embodiments described are exemplary only. Other and further embodiments may be devised without departing from the basic scope thereof, with the true scope and spirit of the disclosure being indicated by the claims that follow.

What is claimed is:

1. A method to control a transport heating, ventilation, and air conditioning (HVAC) system having a fresh air intake, comprising:
   monitoring an air quality, a set point temperature, a passenger compartment temperature, and an ambient temperature;
   when the passenger compartment temperature is within a threshold range of the set point temperature:
   determining whether a fresh air condition is met based on the monitoring;
   opening a fresh air damper when the fresh air condition is met; and
   increasing an evaporator fan speed in response to opening the fresh air damper,
   wherein the fresh air condition includes a minimum air quality threshold, the fresh air condition being met when the monitoring identifies an air quality that is below the minimum air quality threshold; and
   when the ambient temperature is one of: within an ambient temperature threshold range above the set point temperature and within the ambient temperature threshold range below the set point temperature:
   opening the fresh air damper and increasing the evaporator fan speed in response to opening the fresh air damper.

2. The method according to claim 1, wherein opening the fresh air damper includes opening the fresh air damper to an intermediate position, the intermediate position being between an opened position and a closed position.

3. The method according to claim 1, wherein increasing the evaporator fan speed includes increasing the evaporator fan speed to an intermediate evaporator fan speed that is below a maximum evaporator fan speed.

4. The method according to claim 1, further comprising:
   closing the fresh air damper when the fresh air condition is no longer met; and
   decreasing the evaporator fan speed in response to closing the fresh air damper.

5. The method according to claim 4, wherein closing the fresh air damper includes closing the fresh air damper to an intermediate position, the intermediate position being between a closed and an opened position.

6. The method according to claim 4, wherein decreasing the evaporator fan speed includes decreasing the evaporator fan speed to an intermediate evaporator fan speed that is above a minimum evaporator fan speed.

7. The method according to claim 1, wherein when the passenger compartment temperature is outside the threshold range of the set point temperature, the HVAC system is operated in a temperature control mode.

8. The method according to claim 7, wherein in the temperature control mode, the evaporator fan speed is determined such that the set point temperature is prioritized over the fresh air condition.

9. A fresh airflow intake system for a transport heating, ventilation, and air conditioning (HVAC) system, comprising:
   a fresh air damper configured to regulate a flow of fresh air into the transport HVAC system;
   an evaporator fan having at least a high speed mode and a low speed mode; and
   a controller, the controller configured to:
   monitor an air quality, a set point temperature, a passenger compartment temperature, and an ambient temperature;
   when the passenger compartment temperature is within a threshold range of the set point temperature:
   determine whether a fresh air condition is met,
   increase a fresh airflow in response to determining the fresh air condition is met,
   increase an evaporator fan speed when the fresh airflow is increased,
   wherein the fresh air condition includes a minimum air quality threshold, the fresh air condition being met when the controller identifies an air quality that is below the minimum air quality threshold, and
   when the ambient temperature is one of: within an ambient temperature threshold range above the set point temperature and within the ambient temperature threshold range below the set point temperature:
   open the fresh air damper and increase the evaporator fan speed in response to opening the fresh air damper.

10. The fresh airflow intake system according to claim 9, further comprising one or more air quality sensors, and wherein the fresh air condition is met when the air quality determined from the one or more air quality sensors is below a minimum air quality threshold.

11. The fresh airflow intake system according to claim 10, wherein the one or more quality sensors includes a carbon dioxide sensor configured to detect an amount of carbon dioxide in a passenger compartment of a transport vehicle.

12. The fresh airflow intake system according to claim 9, the controller further configured to:
   decrease the fresh airflow in response to determining the fresh air condition is no longer met; and
   decrease the evaporator fan speed when the fresh airflow is decreased.

13. A method to control a transport heating, ventilation, and air conditioning (HVAC) system having a fresh air intake, comprising:
   determining a passenger compartment temperature from a temperature sensor;
   comparing, by a controller, the passenger compartment temperature with a set point temperature;
   determining an air quality measurement from an air quality sensor;
   opening a fresh air damper when the passenger compartment temperature and the set point temperature are within a threshold range and the air quality measurement is below a minimum air quality threshold;
   increasing an evaporator fan speed in response to opening the fresh air damper;
   closing the fresh air damper when the passenger compartment temperature is not within the threshold range;

determining an ambient temperature; and opening the fresh air damper and increasing the evaporator fan speed in response to determining that the ambient temperature is one of: within an ambient temperature threshold range above the set point temperature and within the ambient temperature threshold range below the set point temperature.

14. The method according to claim 13, wherein opening the fresh air damper includes opening the fresh air damper to an intermediate position, the intermediate position being between an opened position and a closed position.

15. The method according to claim 13, wherein increasing the evaporator fan speed includes increasing the evaporator fan speed to an intermediate evaporator fan speed that is below a maximum evaporator fan speed.

16. The method according to claim 13, further comprising:

closing the fresh air damper when the air quality measurement is above the minimum air quality threshold; and decreasing the evaporator fan speed in response to closing the fresh air damper.

17. The method according to claim 16, wherein closing the fresh air damper includes closing the fresh air damper to an intermediate position, the intermediate position being between a closed and an opened position.

18. The method according to claim 16, wherein decreasing the evaporator fan speed includes decreasing the evaporator fan speed to an intermediate evaporator fan speed that is above a minimum evaporator fan speed.

\* \* \* \* \*